(12) United States Patent
Ramraz et al.

(10) Patent No.: US 9,668,082 B2
(45) Date of Patent: May 30, 2017

(54) VIRTUAL MACHINE BASED ON A MOBILE DEVICE

(71) Applicant: Red Hat Israel, Ltd., Raanana (IL)

(72) Inventors: Oded Ramraz, Raanana (IL); David Botzer, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 17 days.

(21) Appl. No.: 14/312,997

(22) Filed: Jun. 24, 2014

(65) Prior Publication Data

US 2015/0373478 A1     Dec. 24, 2015

(51) Int. Cl.
| | |
|---|---|
| H04M 11/00 | (2006.01) |
| H04W 4/00 | (2009.01) |
| H04W 8/26 | (2009.01) |
| H04M 3/22 | (2006.01) |
| H04M 15/00 | (2006.01) |
| G06F 9/455 | (2006.01) |
| H04M 15/28 | (2006.01) |
| H04W 4/24 | (2009.01) |

(52) U.S. Cl.
CPC ........ *H04W 4/001* (2013.01); *G06F 9/45558* (2013.01); *H04M 3/229* (2013.01); *H04M 15/28* (2013.01); *H04M 15/58* (2013.01); *H04W 4/24* (2013.01); *H04W 8/26* (2013.01); *G06F 2009/45562* (2013.01)

(58) Field of Classification Search
CPC ..... H04W 4/001; H04W 8/26; G06F 9/45533; H04M 15/58; H04M 3/229
USPC ............................................ 455/406; 703/20
See application file for complete search history.

(56) References Cited

U.S. PATENT DOCUMENTS

| | | | |
|---|---|---|---|
| 8,302,094 B2 | 10/2012 | Rogel et al. | |
| 8,527,982 B1 | 9/2013 | Sapuntzakis et al. | |
| 8,626,147 B2 | 1/2014 | Danford et al. | |
| 2010/0146504 A1 | 6/2010 | Tang | |
| 2010/0190522 A1* | 7/2010 | Orlassino ................ | G06F 9/455 455/552.1 |
| 2012/0033610 A1* | 2/2012 | Ring ..................... | H04L 67/141 370/328 |
| 2012/0150525 A1* | 6/2012 | Lee .................... | G06Q 30/0641 703/20 |
| 2012/0226740 A1 | 9/2012 | Nath et al. | |
| 2012/0323553 A1 | 12/2012 | Aslam et al. | |
| 2013/0160010 A1* | 6/2013 | Park .................... | G06F 9/45533 718/1 |
| 2015/0099515 A1* | 4/2015 | Kasravi .................. | H04W 8/30 455/435.1 |

OTHER PUBLICATIONS

"Windows Phone 8 SDK on a Virtual Machine with Working Emulator," published Jan. 6, 2013, http://developer.nokia.com/community/wiki/Windows Phone 8 SDK on a Virtual Machine with Working Emulator.

(Continued)

*Primary Examiner* — Charles Shedrick
(74) *Attorney, Agent, or Firm* — Lowenstein Sandler LLP

(57) ABSTRACT

A request to provision a virtual machine (VM) based on a mobile communications device may be received. In response to the request to provision the VM, a phone number may be allocated to be associated with the VM based on the mobile communications device. Furthermore, VM based on the mobile communications device may be provisioned in view of the allocated phone number.

20 Claims, 6 Drawing Sheets

(56) References Cited

OTHER PUBLICATIONS

Hwang et al., "Xen on ARM: System Virtualization using Xen Hypervisor for ARM-based Secure Mobile Phones," Software Laboratories, Corporate Technology Operations, Samsung Electronics Co. Ltd., Maetan-3Dong, Yeongtong-Gu, Suwon-City, Gyeonggi-Do, Korea, 2008, http://ziyang.eecs.umich.edu/~dickrp/ides/papers/hwang-xen.pdf.

Miles, Troy, "How to Use a VirtualBox Android Emulator," Published Nov. 25, 2013, http://java.dzone.com/articies/how-use-virtualbox-android.

"Morpheus3 SDK VirtualMachine," downloaded Apr. 22, 2014, http://www.mobile-devices.com/our-services/morpheus3-sdk-virtualmachine/.

\* cited by examiner

VIRTUAL MACHINE BASED ON A MOBILE DEVICE

TECHNICAL FIELD

Aspects of the disclosure generally relate to virtual machines and, more specifically, relate to a virtual machine based on a mobile device.

BACKGROUND

A virtual machine (VM) may be considered a software-based emulation of computer hardware. For example, the virtual machine may operate based on computer architecture and functions of the computer hardware resources. Thus, the virtual machine may emulate a physical computing environment, but requests for CPU, memory, hard disk, network, and other hardware resources may be managed by a virtualization layer which translates these requests to the underlying physical computing hardware resources. The virtualization layer may be part of a virtual machine management application.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
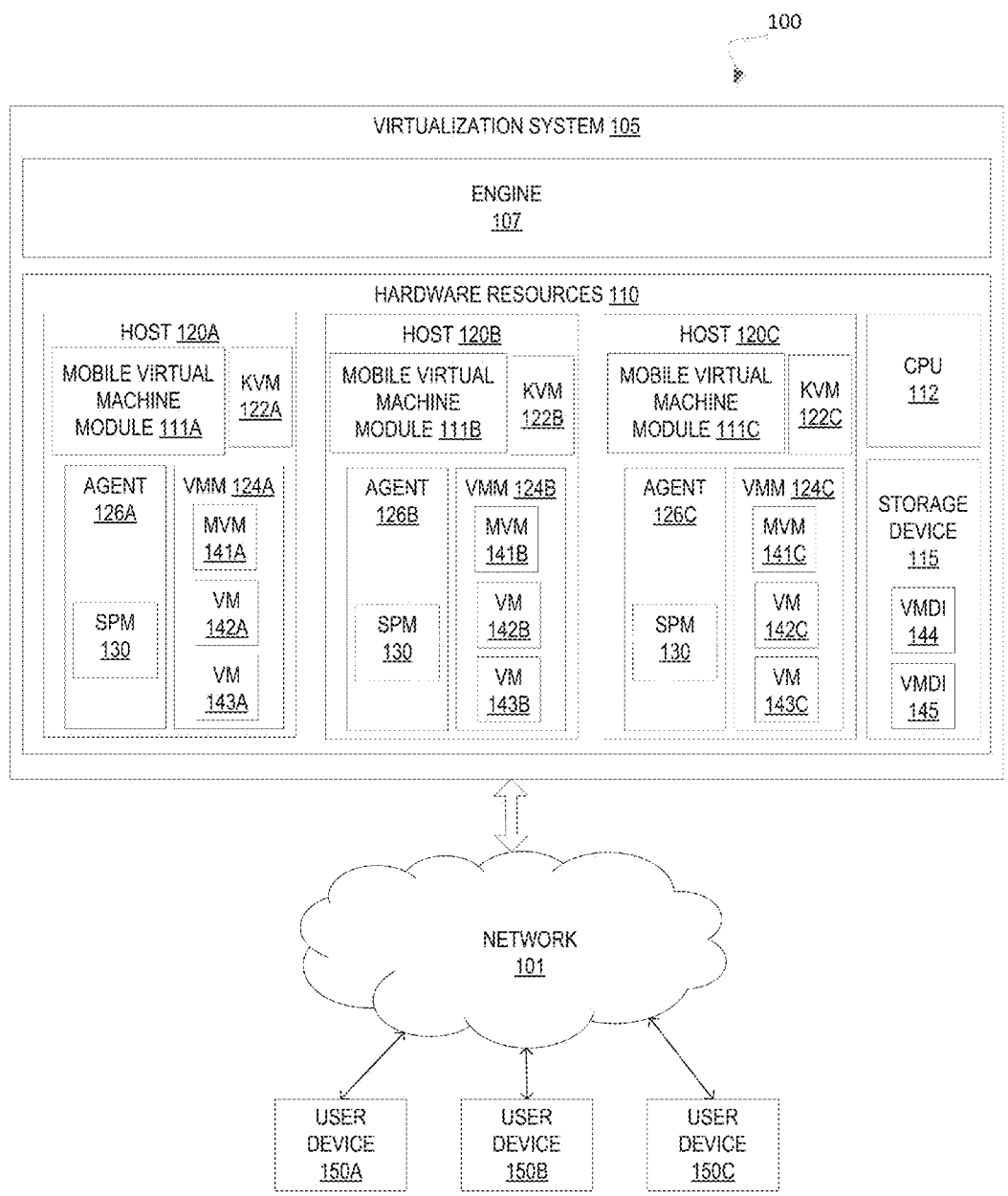
FIG. 1 illustrates an example system architecture in which embodiments of the disclosure may operate.

Embodiments of the disclosure relate to a virtual machine (VM) based on a mobile device. A mobile virtual machine module may provision a virtual machine to emulate a mobile device. In some embodiments, a mobile device may include, but is not limited to, a mobile communications device such as a cellular phone. A virtual machine that emulates the mobile communications device may provide functionality or operations of the mobile communications device to a user of the virtual machine. For example, a virtual machine based on a mobile communications device may provide communications functionality or operations as well as other hardware functionality or operations.

A data center may include one or more host systems that may be part of a virtualization environment to provide one or more virtual machines. For example, physical resources of the data center such as, but not limited to, central processing unit (CPU) resources, memory resources, networks, communication resources, and other hardware or software resources may be used to provide a virtual machine. In some embodiments, one or more virtual machines may be run or provided on a host system of the data center. The host system may run virtual machines based on a mobile communications device and/or virtual machines based on a server or computer that is not a mobile communications device. For example, a single host system of the data center may run a virtual machine based on a mobile communications device and another virtual machine based on a computer (e.g., a conventional virtual machine that does not include the communication functionality or operations of a mobile communications device).

The provisioning or running of a virtual machine based on the mobile communications device may allow a user of the virtual machine to access functionality or operations associated with a mobile communications device through the virtualization environment. For example, a virtual machine based on the mobile communications device may be assigned a phone number so that a user of the virtual machine may access a phone or messaging (e.g., short message service (SMS) text messages or multimedia messaging service (MMS) messages) capability or services associated with the mobile communications device. In some embodiments, if the host system receives a request to provision a virtual machine based on the mobile communications device then the phone number may be assigned to the virtual machine based on the requested virtual machine being based on a mobile communications device. However, if the host system receives a request to provision a virtual machine based on a computer or a server then the phone number may not be assigned to the virtual machine. Thus, the host system may run a first virtual machine that is associated with a phone number (e.g., a virtual machine based on the mobile communications device) and a second virtual machine that is not associated with a phone number. As described in further detail below, additional functionality or operations of a mobile communication device aside from phone and messaging capabilities may further be provided through the virtual machine based on the mobile communications device.

The running by a host system of a virtual machine based on the mobile communications device may enable the testing of a configuration of a mobile communications device through the virtualization environment. For example, the hardware and software capabilities of the mobile communications device may be emulated and used to test a mobile communications device by the virtual machine based on the mobile communications device. As an example, a virtual machine based on the mobile communications device may be assigned a geographical location, a particular service provider (e.g., a communications provider that provides cellular phone and/or messaging services), software applications, and so forth. Thus, geographical tests associated with a mobile communications device, tests between mobile communications devices of different service providers, and so forth may be performed by using the virtual machines based on a mobile communications device.

Furthermore, the performance and the billing of a virtual machine based on the mobile communications device may be provided via the virtualization environment. For example, usage statistics of the virtual machine corresponding to communication operations or functionality of a mobile communications device may be obtained. Additionally, the billing of the virtual machine based on the mobile communications device may also be based on the usage of the communication operations or functionality provided by the virtual machine. In some embodiments, the billing of the virtual machine that is based on the mobile communications device may further be based on hardware usage (e.g., CPU usage, memory usage, and network bandwidth) of a host system or data center as well as the usage of communication operations or functionality associated with the virtual machine (e.g., call time and text messages). Furthermore, the utilization of the virtual machine based on the mobile communications device may be based on parameters that may limit usage of the virtual machine. The parameters that may limit the usage of the virtual machine may be based on hardware resources (e.g., CPU, memory, network bandwidth) and/or communications resources (e.g., minutes of the phone capability used, number of text messages, etc.).

In some embodiments, a mobile virtual machine module may receive or identify a request to provision a virtual machine that is to be based on a mobile communications device. Furthermore, the mobile virtual machine module may receive or identify mobile requirements of the virtual machine. Furthermore, the mobile virtual machine module may allocate a phone number to the virtual machine in response to the provisioning of the virtual machine that is to be based on a mobile communications device and allocate hardware resources to the virtual machine. In some embodiments, the communications functionality or operation of a mobile communications device may thus be provided in a virtualization environment and a billing and testing of the configuration and operation of a mobile communications device may be performed via the virtual machine.

FIG. 1 illustrates an example system architecture 100 in which embodiments of the disclosure may operate. The system architecture 100 includes a virtualization system 105 coupled to and accessible over a network 101 by a number of user devices 150A-150C. The virtualization system 105 includes a variety of hardware resources 110 which may include, but is not limited to, desktop computers, laptop computers, rackmount servers, routers, switches, tablet computers, mobile phones, or any other type of computing device. The hardware resources 110 may include one or more processing devices, memory, and/or additional devices including, but not limited to, a graphics card, hardware RAID controller, network controller, hard disk drive, universal serial bus (USB) device, internal input/output (I/O) device, keyboard, mouse, speaker, etc. The hardware resources 110 may be used to execute software, including one or more operating systems, virtual machines (e.g., a virtual machine based on a mobile communications device), or other applications. The virtualization system also includes an engine 107 (which may execute on a portion of the hardware resources 110 or a separate engine device) that manages the hardware resources 110 and the processes running on the hardware resources 110.

The hardware resources 110 include a number of hosts 120A-120C (or host machines or systems) each including a portion of the hardware resources 110. The hosts 120A-120C may each include one or more processing devices and one or more storage devices. The hardware resources 110 may further include one or more additional processing devices 112 and one or more additional storage devices 115. Furthermore, each host 120A-120C may provide one or more services such as, but not limited to, networking services, storage services, and software libraries. In some embodiments, the virtual machine monitors (VMMs) 124A-124C and/or the virtual machines 141A-141C, 142A-142C, and 143A-143C may use the one or more services that are provided by the hosts 120A-120C. In some embodiments, the virtual machines 141A, 141B, and 141C may be a mobile virtual machine (MVM) (e.g., a virtual machine based on a mobile communications device).

Each of the hosts 120A-120C includes a kernel space and a user space defined by the hardware resources of the host 120A-120C. A kernel-based virtual machine (KVM) 122A-122C is executed in the kernel space of the host 120A-120C. The KVM 122A-122C allows a host 120A-120C to make its hardware and software resources or services available to virtual machines 141A-143C and/or VMMs 124A-124C which may be executed in the user space. In some embodiments, the hardware and software resources available to the mobile virtual machines 141A, 141B, and 141C may include, but is not limited to, communication resources such as phone capabilities and text messaging capabilities.

Each of the hosts 120A-120C may execute a virtual machine monitor (VMM) 124A-124C (or a hypervisor or software package to be installed on the host systems as described herein). The VMM 124A-124C is an application that executes on a host 120A-120C to manage virtual machines 141A-143C. In particular, the VMM 124A-124C may instantiate or start, migrate, pause, or perform another type of event associated with virtual machines 141A-143C. The VMM 124A-124C may include a virtualization API and a multi-platform emulator. Each virtual machine 141A-143C may execute a guest operating system that can be accessed by a user device 150A-150C over the network 101. Each virtual machine 141A-143C may further run guest applications using the guest operating system.

Each of the hosts 120A-120C may include an agent 126A-126C. The agent 126A-126C may facilitate inter-host communication and perform various monitoring and administrative tasks. The agent 126A-126C may also include functionality for acting as a storage pool manager (SPM) 130. However, in some embodiments, one of the hosts 120A may be active as the SPM at any one time. The host 120A may be designated an active SPM 130 by the engine 107. The SPM 130 coordinates metadata changes in the virtualization system 105, such as creating and deleting disk images, creating and merging snapshots, copying images between storage domains, creating templates and storage allocation for block devices of the hardware resources 110 such as hard drives or other storage devices.

As shown in FIG. 1, each of the hosts 120A-120C may include a mobile virtual machine module 111A-111C. In some embodiments, the mobile virtual machine modules 111A-111C may provision the mobile virtual machines 141A, 141B, and 141C, assign a phone number to the mobile virtual machines 141A, 141B, and 141C, and determine software packages to be installed on the hosts 120A-120C (e.g., the VMMs 124A-124C). Further details with regard to the mobile virtual machine modules 111A-111C are disclosed below.

Figure 2:
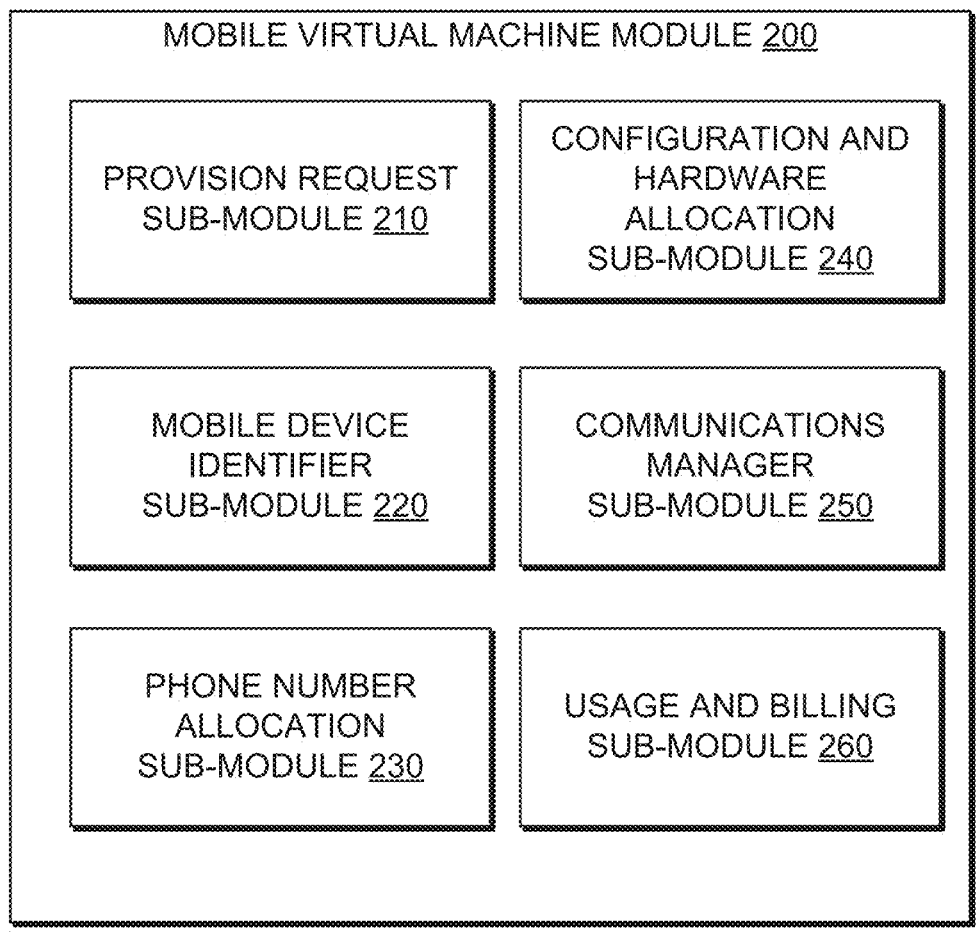
FIG. 2 is a block diagram of an example mobile virtual machine module in accordance with some embodiments of the disclosure.

FIG. 2 is a block diagram of an example mobile virtual machine module 200 in accordance with some embodiments of the disclosure. In general, the mobile virtual machine module 200 may correspond to the mobile virtual machine module 111A-111C of FIG. 1. The mobile virtual machine module 200 may include a provision request sub-module 210, a mobile device identifier sub-module 220, a phone number allocator sub-module 230, a hardware allocator sub-module 240, a communications manager sub-module 250, and a usage and billing sub-module 260. In alternative embodiments, the functionality of one or more of the sub-modules may be combined or divided.

As shown in FIG. 2, the mobile virtual machine module 200 may include a provision request sub-module 210. In some embodiments, the provision request sub-module 210 may receive a request from a user to provision a virtual machine to be run on a host system. Furthermore, the mobile virtual machine module 200 may include a mobile device identifier sub-module 220. In some embodiments, the mobile device identifier sub-module 220 may identify that the request to provision the virtual machine is associated with a virtual machine based on a mobile communications device (e.g., a MVM 141A, 141B, or 141C). For example, the mobile device identifier sub-module 220 may identify that the type of virtual machine requested is based on a mobile communications device. Furthermore, the mobile virtual machine module 200 may include a phone number allocation sub-module 230. In some embodiments, the phone number allocation sub-module 230 may allocate a phone number to the virtual machine that is to be provisioned in response to the request received by the provision request sub-module 210. In the same or alternative embodiments, the phone number that is allocated to the virtual machine that is based on the mobile communications device may be selected from a group of available phone numbers associated with a host system and/or a data center that includes one or more host systems that may be used to run virtual machines. Thus, in some embodiments, a phone number may be allocated or assigned to the virtual machine in response to an identification that the virtual machine is to be based on a mobile communications device.

Referring to FIG. 2, the mobile virtual machine module 200 may further include a configuration and hardware allocation sub-module 240. In some embodiments, the configuration and hardware allocation sub-module 240 may allocate or assign hardware resources of a host system to run the virtual machine. For example, the hardware resources and/or communications resources of the host system or the data center (e.g., network bandwidth, CPU capability, and memory storage, phone numbers, etc.) may be assigned or allocated to the virtual machine. In some embodiments, the assigned or allocated hardware resources and communication resources may be based on the functionality and capability of a mobile communications device. Furthermore, the configuration and hardware allocation sub-module 240 may configure a virtual machine that is based on a mobile communications device. For example, a request to provision a virtual machine may identify that the virtual machine is to be based on a mobile communications device and its communications functionality or operations are to be based on a particular service provider, geographical location, or other such communications service parameter. The configuration and hardware allocation sub-module 240 may thus configure a setting or communications service parameter of the virtual machine based on the requested service provider, geographical location, or other communications service parameter. The mobile virtual machine module 200 may include a communications manager sub-module 250. In some embodiments, the communications manager sub-module 250 may manage communications functions or operations (e.g., phone capability, voice mail, and messaging services) of the virtual machine that is based on the mobile communications device.

The mobile virtual machine module 200 may further include a usage and billing sub-module 260. In some embodiments, the usage and billing sub-module 260 may control the usage of the virtual machine that is based on the mobile communications device as well as determine or calculate billing information associated with the virtual machine that is based on the mobile communications device. For example, the usage and billing sub-module 260 may limit the usage of the virtual machine based on mobile communications device parameters as well as emulate a billing system for a mobile communications device that is based on the usage of the communications functionality or operations of the mobile communications device as well as resources of the virtualization environment (e.g., hardware resources of a host system).

As such, the mobile virtual machine module 200 may support the provisioning and running of a virtual machine that is based on a mobile communications device by a host system of a data center. Additional details with regard to the provisioning and running of a virtual machine based on the mobile communications device are described below with regard to FIGS. 3-5.

Figure 3:
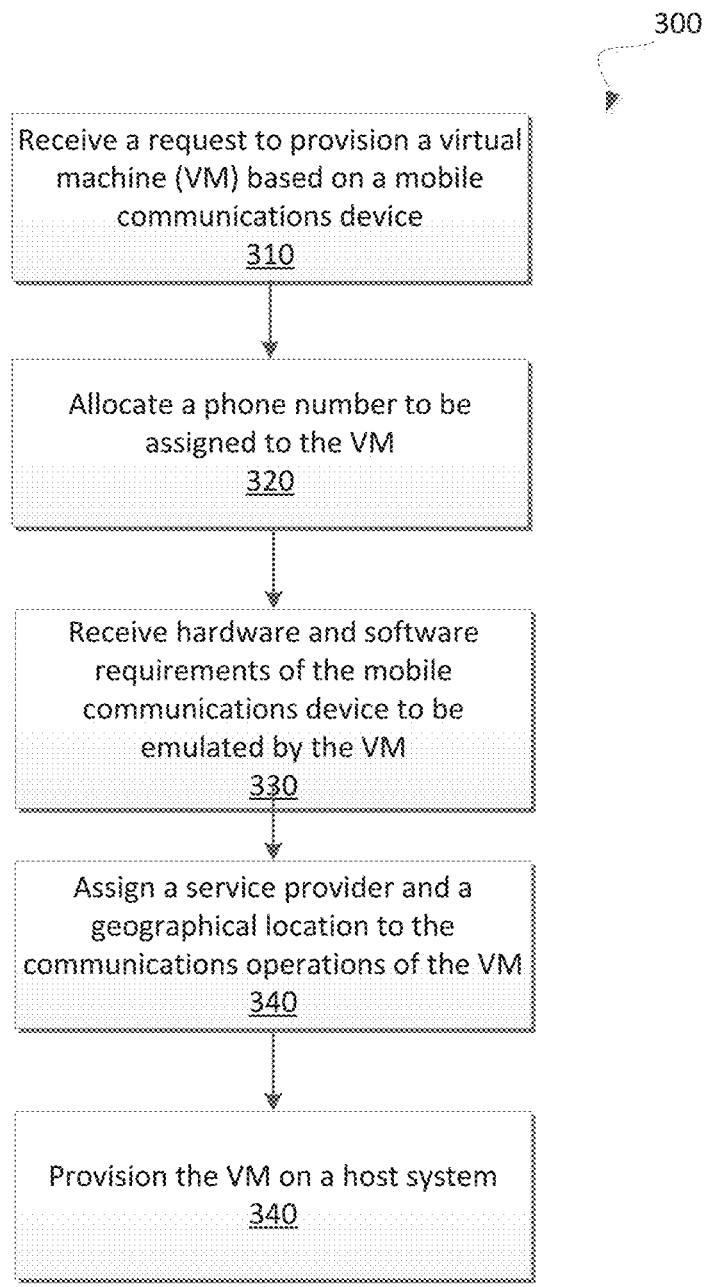
FIG. 3 is a flow diagram of an example method to provision a virtual machine based on a mobile communications device in accordance with some embodiments.

FIG. 3 is an example method 300 to provision a virtual machine based on a mobile communications device. The method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by the mobile virtual machine module 200 of FIG. 2.

As shown in FIG. 3, the method 300 may begin with the processing logic receiving a request to provision a virtual machine based on a mobile communications device (block 310). For example, the processing logic may receive a request to provision a virtual machine and may identify that the requested virtual machine is to be based on a mobile communications device as opposed to a desktop computer or server. The processing logic may allocate a phone number to the virtual machine that is based on the mobile communications device (block 320). In some embodiments, the phone number may be allocated to the virtual machine in response to the identification that the requested virtual machine is to be based on a mobile communications device. For example, in some embodiments, a requested virtual machine may be based on a mobile communications device or may not be based on the mobile communications device (e.g., a desktop computer or server without the communication capabilities of the mobile communications device). The phone number may thus be allocated to the requested virtual machine if the virtual machine is to be based on a mobile communications device and the phone number may not be allocated to the requested virtual machine if the virtual machine is not to be based on a mobile communications device.

In some embodiments, the phone number may be allocated to the virtual machine based on a group or set of available phone numbers. For example, a host system of a data center may be associated with a group or set of available phone numbers. In some embodiments, one of the phone numbers of the group or set available for the host system that is to run the virtual machine may be allocated to the virtual machine. Furthermore, in some embodiments, a single phone number may be assigned to multiple virtual machines that are based on a mobile communications device. For example, a first phone number may be assigned to a first virtual machine and the first phone number may also be assigned to a second virtual machine. In such a case, either the first virtual machine or the second virtual machine may access communication operations or functionality via the same first phone number.

Referring to FIG. 3, the processing logic may receive hardware requirements and software requirements of the mobile communications device to be emulated by the virtual machine (block 330). In some embodiments, the hardware requirements and the software requirements of the mobile communications device may include, but is not limited to, an operating system, screen size, resolution, CPU type, memory, and whether the mobile communications device is to have a front camera and/or a back camera. In some embodiments, when the hardware requirements of the mobile communications device specifies that the mobile communications device is to have a front camera and/or a back camera then a remote camera may be assigned to the mobile communications device. For example, a host system to run a virtual machine may be associated with one or more remote cameras in a data center. If a virtual machine is to include a front camera and a back camera then a first remote camera and a second remote camera of the data center may be assigned to the virtual machine. Thus, in some embodiments, if a user of the virtual machine that is based on a mobile communications device that includes a camera functionality uses the camera functionality of the virtual machine then the user may access a remote camera of the data center that has been assigned to the virtual machine.

Referring to FIG. 3, the processing logic may assign a service provider and a geographical location to communications operations or functionality of the virtual machine (block 340). For example, as previously described, a phone number may be allocated to the virtual machine that is based on a mobile communications device. In some embodiments, a service provider that provides a communications service based on the phone number may be assigned to the virtual machine. In the same or alternative embodiments, the service provider may be selected from multiple service providers that may be used to provide a service for the communications operations or functionality of the virtual machine. For example, a first service provider (e.g., a first cellular network provider) may be assigned to the virtual machine and a first software package or configuration to provide the communication services for the virtual machine may be provided to or accessed by the virtual machine or a second service provider may be assigned to the virtual machine and a second software package or configuration to provide communication services for the second service provider may be provided to or accessed by the virtual machine. Furthermore, a geographical location may be assigned to the virtual machine. For example, an identification of a phone number area code, country, region, or other geographical locations may be assigned to the virtual machine. A configuration setting of the virtual machine may be adjusted or assigned based on the geographical location assigned to the virtual machine. In some embodiments, the configuration setting of the virtual machine may be adjusted after the provisioning of the virtual machine. For example, a first configuration setting associated with a first geographical location may be assigned to the virtual machine when it is first provisioned and at a later time a second geographical location may be assigned to the virtual machine.

In some embodiments, the communications functionality or operation of a virtual machine based on the mobile communications device may be tested based on the configuration settings that are assigned to the virtual machine. For example, a first virtual machine may be assigned a first service provider and a first geographical region and communications operations or functionality of the first virtual machine may be tested. In some embodiments, the testing of the communications operations or functionality may include, but is not limited to, the using of the communications operations or functionality of the virtual machine. As an example, a command to place a phone call or transmit a text message may be transmitted to the first virtual machine and the operations of the first virtual machine in response to the command may be recorded to verify if the first virtual machine operated correctly or did not operate correctly when placing the phone call or transmitting the text message. Furthermore, in some embodiments, the interaction between the first virtual machine and a second virtual machine with different communications configuration settings may be tested. For example, the second virtual machine that is based on a mobile communications device may be assigned a second service provider and a second geographical location. A phone call or text message from the first virtual machine to the second virtual machine may be initiated and recorded to test the operations of the first virtual machine interacting with the second virtual machine that has different assigned configuration settings. For example, the successful transmission or placement of the text message or phone call from the first virtual machine and the successful receiving of the text message or phone call may be tested. Furthermore, in some embodiments, billing services associated with the geographical location may be tested. In some embodiments, the geographical location may correspond to roaming charges in a billing service. In the same or alternative embodiments, roaming charges may refer to billing expenses associated with communications functions or operations associated with a first geographical location (e.g., a virtual machine based on a mobile communications device that is assigned a configuration parameter of the first geographical location) and a second geographical location. For example, in some embodiments, a billing charge or expense may be greater when a communications operation is between two virtual machines of different geographical locations as opposed to when the communications operation is between two virtual machines with the same geographical location. Furthermore, a test may be performed between the first virtual machine and the second virtual machine based on the service providers assigned to the first and virtual machines. For example, the first virtual machine may be assigned a first service provider and the second virtual machine may be assigned a second service provider. The use of communications services provided by the first service provider for the first virtual machine may be tested by transmitting a communication (e.g., a phone call or a text message) from the first virtual machine to a second virtual machine that may be assigned a second service provider that is different than the first service provider. Thus, communications between different service providers may be tested based on the virtual machines.

As shown in FIG. 3, the processing logic may further provision the virtual machine on a host system (block 350). For example, the processing logic may provision the virtual machine to be run on the host system based on the allocated phone number, hardware and software requirements, service provider, and geographical location to be assigned to the virtual machine that is based on a mobile communications device.

Figure 4:
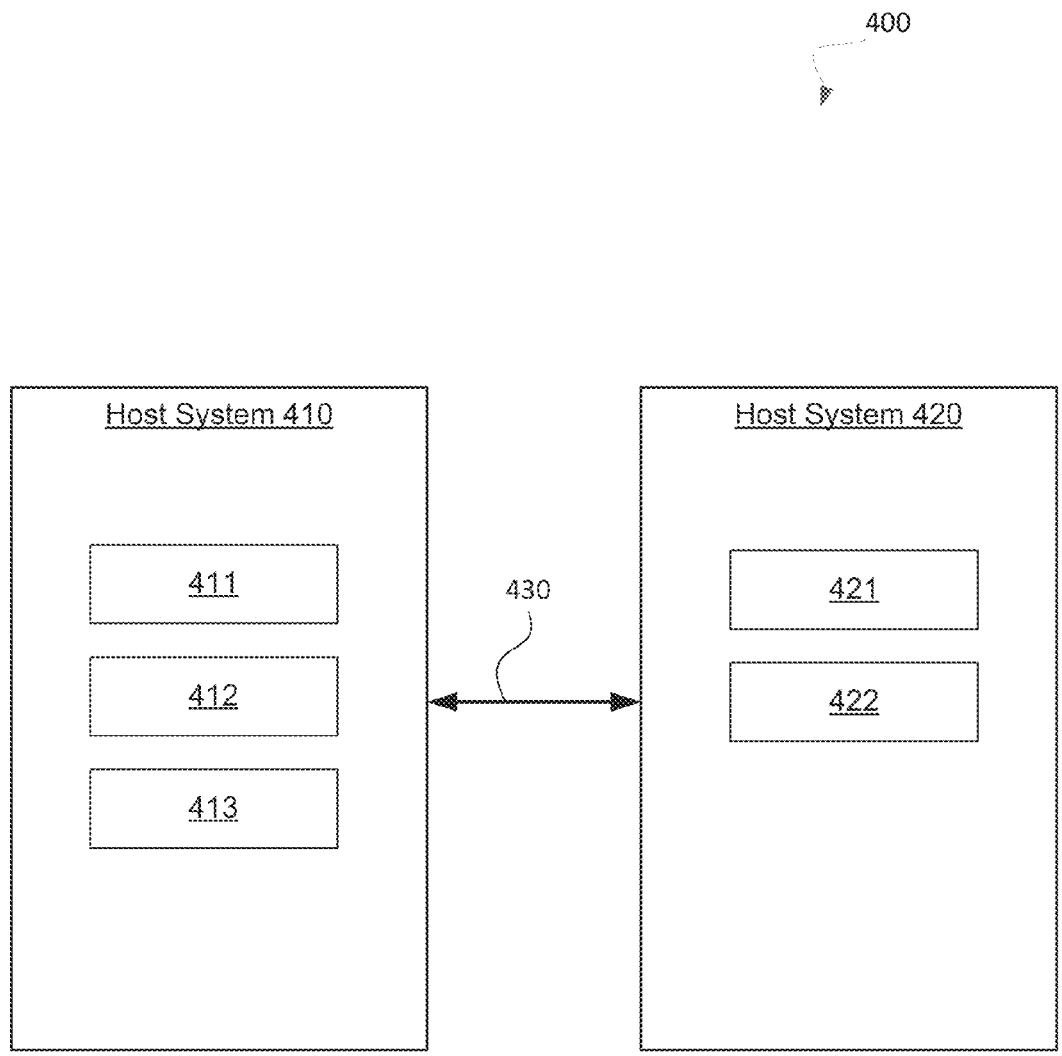
FIG. 4 is a block diagram of an example data center with host systems to run virtual machines based on a mobile communications device in accordance with some embodiments of the disclosure.

FIG. 4 is a block diagram of an example data center 400 with host systems to run virtual machines based on a mobile communications device. In general, the data center 400 may include host systems 410 and 420 that may each correspond to the virtualization system 105 of FIG. 1.

As shown in FIG. 4, the data center 400 may include a first host system 410 and a second host system 420. A network 430 may enable communications between the first host system 410 and the second host system 420. For example, a virtual machine that is run by the first host system 410 may receive and/or transmit information or data to another virtual machine that is run by the second host system 420. In some embodiments, the first host system 410 and the second host system 420 may run virtual machines that are based on a mobile communications device and virtual machines that are not based on a mobile communications device. For example, the first host system 410 may run a virtual machine 411, a virtual machine 412, and a virtual machine 413 and the second host system 420 may run a virtual machine 421 and a virtual machine 422. The virtual machine 411 may not be based on a mobile communications device while the virtual machines 412 and 413 may be based on a mobile communications device. Furthermore, the virtual machine 421 may not be based on a mobile communications device and the virtual machine 422 may be based on a mobile communications device. Thus, both the first host system 410 and the second host system 420 may be run both types of virtual machines. In some embodiments, a virtual machine that is based on a mobile communications device may communicate with another virtual machine that is not based on a mobile communications device (e.g., over the network 430) by using a network address such as a media access control (MAC) address or an Internet Protocol (IP) address.

As previously described, a phone number may be assigned or allocated to a virtual machine that is based on a mobile communications device. For example, a first phone number may be assigned to the virtual machine 412, a second phone number may be assigned to the virtual machine 413, and a third phone number may be assigned to the virtual machine 422. In alternative embodiments, the first phone number may be assigned to the virtual machines 412 and 413 and the second phone number may be assigned to the virtual machine 422.

Thus, a data center may include multiple host systems that each may run one or more virtual machines. The virtual machines of the host systems may be based on a mobile communications device.

In some embodiments, a virtual machine that is based on a mobile communications device may be associated with different software libraries than a virtual machine that is not based on a mobile communications device. A software library may refer to programming code that may implement a certain behavior. In some embodiments, a higher level program (e.g., an operating system associated with a virtual machine) may use a software library to make calls that implement behavior based on the programming code of the software library. Thus, a virtual machine that is based on a mobile communications device may be assigned one or more software libraries that provide or implement communications functions or operations and a virtual machine that is not based on the mobile communications device may be assigned different software libraries that do not provide or implement the communications functions or operations of a mobile communications device.

Figure 5:
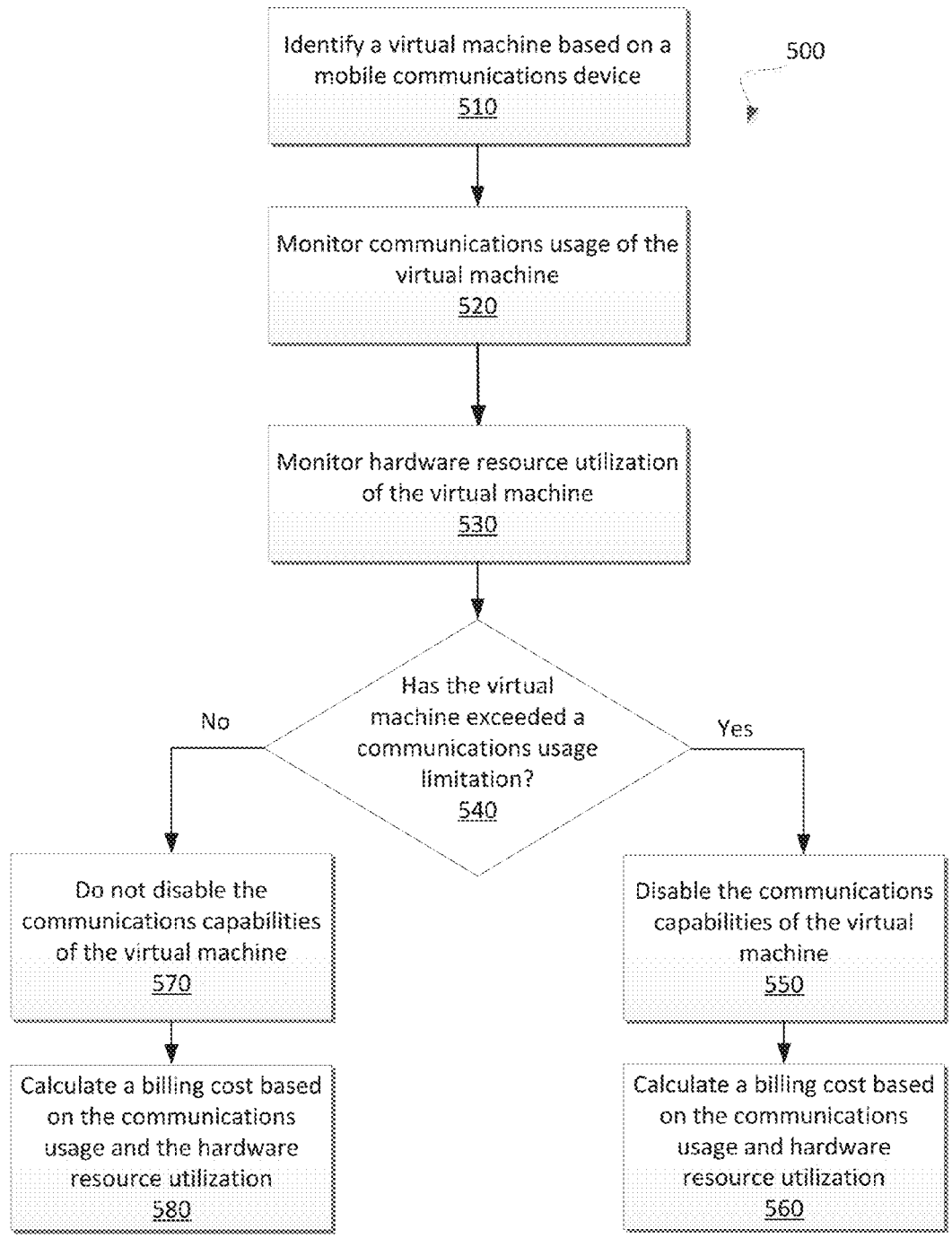
FIG. 5 is a flow diagram of an example method to provide a usage and billing service associated with the virtual machine based on a mobile communications device in accordance with some embodiments of the disclosure.

FIG. 5 is an illustrated example method 500 to provide a usage and billing service associated with the virtual machine based on a mobile communications device. The method 500 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 500 may be performed by the mobile virtual machine module 200 of FIG. 2.

As shown in FIG. 5, the method 500 may begin with the processing logic identifying a virtual machine based on a mobile communications device (510). For example, a virtual machine based on a mobile communications device that is running on a host system of a data center may be identified. The processing logic may further monitor the communications usage of the virtual machine (block 520). For example, as previously described, a virtual machine that is based on a mobile communications device may be assigned a phone number and a service provider. In some embodiments, a communications usage limitation may be assigned to the virtual machine. For example, an amount of call time and/or number of messages using the assigned phone number and the assigned service provider may be specified for the virtual machine. In some embodiments, a first communications usage limitation may specify a maximum amount of call time and/or number of messages that the virtual machine may send and/or receive to another virtual machine in the data center and a second communications usage limitation that may specify a maximum amount of call time and/or number of messages that the virtual machine may send and/or receive to an endpoint (e.g., another phone number) that is not in the data center (e.g., a call to an endpoint that is not another virtual machine). Thus, the communications usage limitation of a virtual machine that is based on a mobile communications device may specify a maximum usage of the virtual machine to use the communication capabilities or functionality. The processing logic may further monitor hardware resource utilization of the virtual machine (block 530). For example, an amount of CPU usage or memory usage associated with the virtual machine may be monitored.

The processing logic may further determine if the virtual machine has met or exceeded a communications usage limitation (block 540). For example, if the communications usage of the virtual machine meets or exceeds a threshold value then the communications capabilities or functionality of the virtual machine may be disabled (block 550). For example, the communications capabilities of the virtual machine based on the assigned phone number may be disabled. Furthermore, a billing cost for the virtual machine may be calculated based on the communications usage and the hardware utilization (block 560). Thus, a billing statement for the virtual machine may be based on the communications operations and the hardware utilization of the virtual machine in the data center. However, if the communications usage of the virtual machine does not meet or exceed the threshold value then the communications capabilities or functionality of the virtual machine may not be disabled and the virtual machine may continue to use the communications capabilities or functionality based on the assigned phone number (block 570). Furthermore, a billing cost for the virtual machine may be calculated based on the communications usage and the hardware utilization (block 580).

Figure 6:
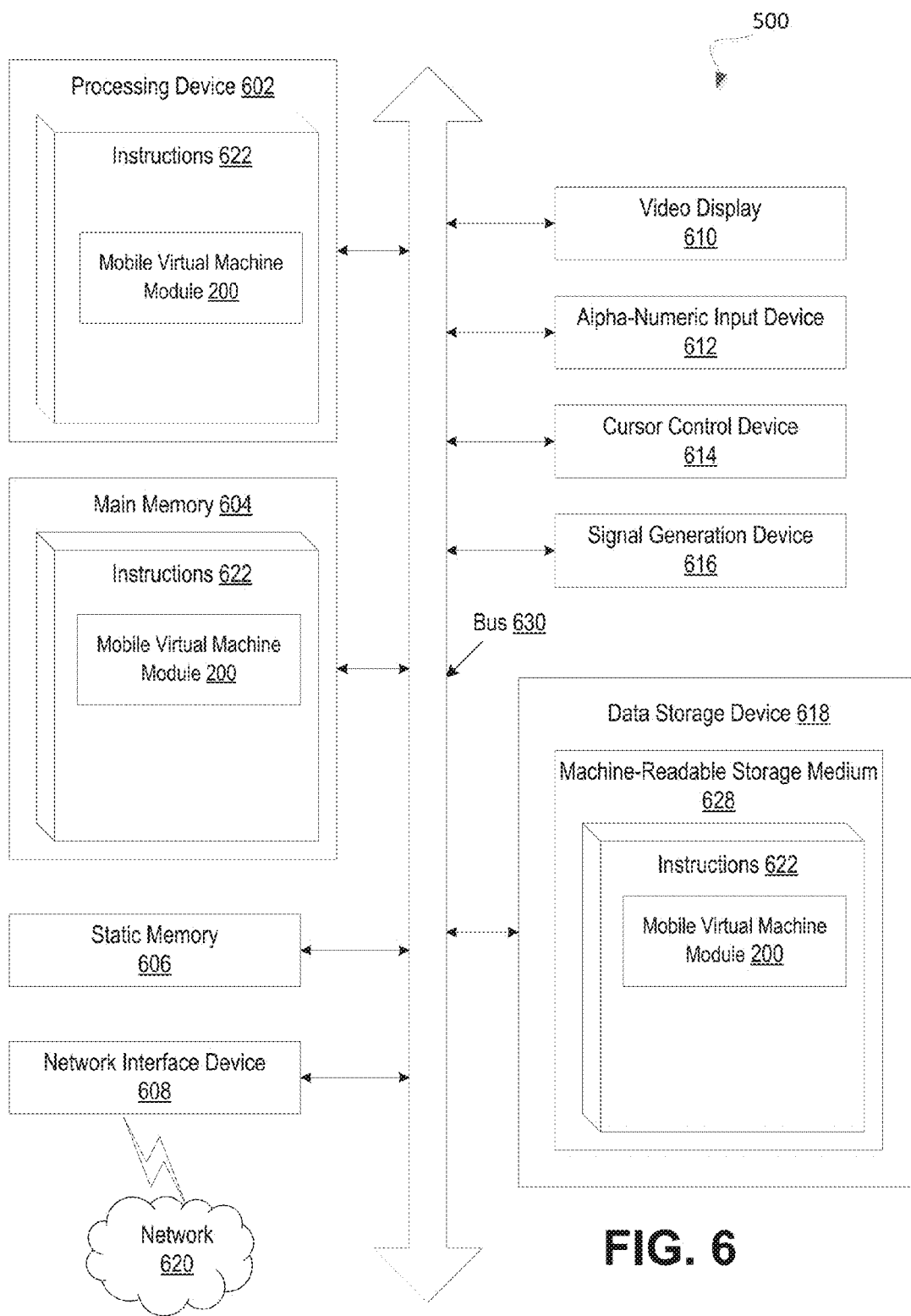
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a row module (e.g., mobile virtual machine module 111A-111C of FIG. 1 and/or mobile virtual machine module 200 of FIG. 2) and/or a software library containing methods that call modules or sub-modules in a mobile virtual machine module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving a request to provision a first virtual machine (VM) in view of a mobile communications device;
receiving a hardware requirement of the mobile communications device;
allocating, in response to the request to provision the first VM, a phone number to be associated with the first VM in view of the mobile communications device;
provisioning, by a processing device, the first VM in view of the hardware requirement of the mobile communications device and the allocated phone number;
determining whether a communications usage for the first VM in view of the allocated phone number exceeds a threshold amount of usage;
in response to determining that the communications usage for the VM in view of the allocated phone number exceeds the threshold amount of usage, disabling a functionality of the first VM; and
determining a cost corresponding to the first VM in view of the communications usage associated with the allocated phone number and hardware usage associated with provisioning the first VM in view of the disabling of the functionality of the first VM.

2. The method of claim 1, wherein the first VM is provisioned on a host system in a virtualization environment, and wherein the host system comprises at least one additional VM that is not in view of a mobile communications device, and wherein a library associated with the first VM in view of the mobile communications device is different than a library associated with the at least one additional VM that is not in view of the mobile communications device.

3. The method of claim 1, further comprising:
providing a billing estimate in view of the communications usage associated with the allocated phone number and the hardware usage associated with the first VM.

4. The method of claim 1, further comprising:
assigning a first geographical location to the first VM in view of the mobile communications device.

5. The method of claim 4, wherein a second VM in view of a second mobile communications device is assigned a second phone number, and wherein the method further comprises:
transmitting a communication from the first VM to the second VM in view of the first phone number and the second phone number.

6. The method of claim 5, wherein the first VM is associated with a first service provider that is associated with a communication service of the first VM, and wherein the second VM is associated with a second geographical location and a second service provider associated with a communication service of the second VM, and wherein the transmitting of the communication is further in view of the first service provider and the second service provider.

7. The method of claim 6, wherein the transmitting of the communication from the first VM to the second VM is tested by verifying that the second VM associated with the second service provider and the second geographical location receives the transmission of the communication from the first VM.

8. A system, comprising:
a memory; and
a processing device, operatively coupled with the memory, to:
receive a request to provision a first virtual machine (VM) in view of a mobile communications device;
receive a hardware requirement of the mobile communications device;
allocate, in response to the request to provision the first VM, a phone number to be associated with the first VM in view of the mobile communications device;
provision the first VM in view of the hardware requirement of the mobile communications device and the allocated phone number;
determine whether a communications usage for the first VM in view of the allocated phone number exceeds a threshold amount of usage;
in response to determining that the communications usage for the VM in view of the allocated phone number exceeds the threshold amount of usage, disable a functionality of the first VM; and
determine a cost corresponding to the first VM in view of communications usage associated with the allocated phone number and hardware usage associated with provisioning the first VM in view of the disabling of the functionality of the first VM.

9. The system of claim 8, wherein the first VM is provisioned on a host system in a virtualization environment, and wherein the host system comprises at least one additional VM that is not in view of a mobile communications device, and wherein a library associated with the first VM in view of the mobile communications device is different than a library associated with the at least one additional VM that is not in view of the mobile communications device.

10. The system of claim 8, wherein the processing device is further to:
provide a billing estimate in view of the communications usage associated with the allocated phone number and the hardware usage associated with the first VM.

11. The system of claim 8, wherein the processing device is further to:
assign a first geographical location to the first VM in view of the mobile communications device.

12. The system of claim 11, wherein a second VM in view of a second mobile communications device is assigned a second phone number, and wherein the processing device is further to:
transmit a communication from the first VM to the second VM in view of the first phone number and the second phone number.

13. The system of claim 12, wherein the first VM is associated with a first service provider that is associated with a communication service of the first VM, and wherein the second VM is associated with a second geographical location and a second service provider associated with a communication service of the second VM, and wherein the transmitting of the communication is further in view of the first service provider and the second service provider.

14. The system of claim 13, wherein the transmitting of the communication from the first VM to the second VM is tested by verifying that the second VM associated with the second service provider and the second geographical location receives the transmission of the communication from the first VM.

15. A non-transitory machine-readable storage medium comprising instructions that, when accessed by a processing device, cause the processing device to:
   receive a request to provision a first virtual machine (VM) in view of a mobile communications device;
   receive a hardware requirement of the mobile communications device;
   allocate, in response to the request to provision the first VM, a phone number to be associated with the first VM in view of the mobile communications device;
   provision, by the processing device, the first VM in view of the hardware requirement of the mobile communications device and the allocated phone number;
   determine whether a communications usage for the first VM in view of the allocated phone number exceeds a threshold amount of usage;
   in response to determining that the communications usage for the VM in view of the allocated phone number exceeds the threshold amount of usage, disable a functionality of the first VM; and
   determine a cost corresponding to the first VM in view of communications usage associated with the allocated phone number and hardware usage associated with provisioning the first VM in view of the disabling of the functionality of the first VM.

16. The non-transitory machine-readable storage medium of claim 15, wherein the first VM is provisioned on a host system in a virtualization environment, and wherein the host system comprises at least one additional VM that is not in view of a mobile communications device, and wherein a library associated with the first VM in view of the mobile communications device is different than a library associated with the at least one additional VM that is not in view of the mobile communications device.

17. The non-transitory machine-readable storage medium of claim 15, wherein the processing device is further to:
   provide a billing estimate in view of the communications usage associated with the allocated phone number and the hardware usage associated with the first VM.

18. The non-transitory machine-readable storage medium of claim 15, wherein the processing device is further to:
   assign a first geographical location to the first VM in view of the mobile communications device.

19. The non-transitory machine-readable storage medium of claim 18, wherein a second VM in view of a second mobile communications device is assigned a second phone number, and wherein the processing device is further to:
   transmit a communication from the first VM to the second VM in view of the first phone number and the second phone number; and
   transmit a communication from the first VM to a third VM that is not in view of a mobile communications device in view of a network address associated with the third VM.

20. The non-transitory machine-readable storage medium of claim 19, wherein the first VM is associated with a first service provider that is associated with a communication service of the first VM, and wherein the second VM is associated with a second geographical location and a second service provider associated with a communication service of the second VM, and wherein the transmitting of the communication is further in view of the first service provider and the second service provider.

* * * * *